United States Patent [19]

Ely

[11] Patent Number: 5,452,220
[45] Date of Patent: Sep. 19, 1995

[54] AUTOMATIC ADJUSTMENT OF VENEER LATHE NOSE BAR HEIGHT RELATIVE TO KNIFE DURING PEELING

[75] Inventor: Gary W. Ely, Canby, Oreg.

[73] Assignee: The Coe Manufacturing Company, Portland, Oreg.

[21] Appl. No.: 238,706

[22] Filed: May 5, 1994

[51] Int. Cl.⁶ .............................................. G05B 19/18
[52] U.S. Cl. ................................. 364/474.09; 144/357; 144/365; 144/211; 144/213
[58] Field of Search ...................... 364/474.07, 474.02, 364/167.01; 83/370; 144/2 R, 210, 211, 212, 213, 178, 209 R, 356, 357, 365

[56] References Cited

U.S. PATENT DOCUMENTS

| | | | |
|---|---|---|---|
| 4,380,259 | 4/1983 | Brookhyser et al. | 144/357 |
| 4,602,663 | 7/1986 | Browning, Jr. et al. | 144/213 |
| 4,708,180 | 11/1987 | Browning et al. | 144/213 |
| 4,791,970 | 12/1988 | Walser et al. | 144/213 |
| 4,893,663 | 1/1990 | Ely | 144/356 |
| 4,979,120 | 12/1990 | Ely | 364/474 |

OTHER PUBLICATIONS

Drawing No. AW-23107 of The Coe Manufacturing Company, entitled "M-1484 Roller Nose Bar Ass'y.", dated Jan. 1987.

Primary Examiner—James P. Trammell
Attorney, Agent, or Firm—Klarquist Sparkman Campbell Leigh & Whinston

[57] ABSTRACT

A veneer lathe apparatus and method are described in which the height of the nose bar roller relative to the knife is automatically adjusted during peeling by a computer control system. In addition, the two veneer exit gaps between the nose bar and the knife and between the nose bar and the knife backing member are automatically maintained substantially the same as or slightly greater than the veneer path width which is equal to the thickness of the veneer plus a clearance space of a predetermined amount. As a result the automatic control positions the nose bar as close as possible to the knife during peeling thereby greatly improving the quality of the veneer. The height of the nose bar is adjusted by moving a moveable wedge along a fixed wedge with a control cylinder in response to a computer generated control signal. A resilient hold-down device is employed for mounting the nose bar carriage to enable its horizontal movement and vertical movement with respect to the main carriages during peeling due to height adjustment and horizontal gap adjustment of the nose bar relative to the knife.

20 Claims, 8 Drawing Sheets

AUTOMATIC ADJUSTMENT OF VENEER LATHE NOSE BAR HEIGHT RELATIVE TO KNIFE DURING PEELING

BACKGROUND OF THE INVENTION

The subject matter of the present invention relates generally to a veneer lathe apparatus and method for peeling sheets of wood veneer from a rotating log by means of a lathe knife and a nose bar which engages the side of the log immediately ahead of the knife, and in particular to an automatic control apparatus and method for automatic adjustment of the height of the nose bar above the lathe knife during peeling in response to reduction of the diameter of the log. In this manner, the two veneer exit gaps between the nose bar and the knife and between the nose bar and the knife backing member are automatically maintained at a width substantially the same as or slightly greater than the veneer path width which is equal to the thickness of the veneer plus a clearance space of a predetermined amount. This automatic control lowers the vertical height of the nose bar and positions the nose bar as close as possible to the knife thereby improving the quality of the veneer because such nose bar presses against the log closer to the knife to better back up and stabilize the wood surface of such log as it is being cut by the knife.

It has been proposed in U.S. Pat. No. 4,979,120 of Gary W. Ely, issued Dec. 18, 1990, to provide a veneer lathe with a computer control system for automatically adjusting the pitch angle of the lathe knife during peeling in response to changes in position of the knife carriage corresponding to a reduction in diameter of the log. The control system includes a digital computer having a memory in which a plurality of data tables are stored of different knife pitch angle profile ranges for different wood species. In this patent, the knife angle is adjusted by means of a cam follower roller which is adjusted in height by an eccentric relative to a pitch rail cam member along which the cam follower roller and associated knife carriage move during peeling. It was previously proposed in U.S. Pat. No. 4,708,180 of Browning et al., issued Nov. 24, 1987, to provide a veneer lathe system with an automatic knife gap adjustment during peeling by moving the nose bar of the lathe to different horizontal gap spacings between the knife and the nose bar during peeling by means of a computer control system in response to reductions in the log diameter and changes in knife pitch angle.

It has also been the practice previously to manually adjust the height setting of the nose bar relative to the knife blade to a predetermined position prior to peeling. However, previously there has been no automatic adjustment of the height of the nose bar relative to the lathe knife during peeling, as in the manner of the present invention. This prior lathe apparatus with manually set nose bar height has the disadvantage that the height of the nose bar relative to the knife must be set at a higher position than is necessary to provide a suitable veneer exit gap for small log diameters but such preset height position is higher than necessary for large log diameters. As a result the nose bar is positioned a greater distance from the knife than necessary when peeling large log diameters which reduces the quality of the veneer peeled from the log.

It has also been proposed in U.S. Pat. No. 4,893,663 of Gary W. Ely, issued Jan. 16, 1990, to provide a computer control system and method for automatic adjustment of the lathe knife pitch angle, the horizontal gap spacing between the nose bar and the knife, as well as the radial positions of the core drive rolls and back up rolls on the log in response to reductions in the log diameter and changes in the surface temperature of the log. However, there is no provision for automatically adjusting the height of the nose bar relative to the knife blade during peeling to improve the quality of the veneer in the manner of the present invention.

It has been discovered that it is desirable to position the nose bar at the lowest height position possible relative to the lathe knife in order to cause the nose bar to engage the log close to the knife to better stabilize the wood during cutting and thereby produce peeled wood veneer of higher quality. Therefore, in accordance with the present invention the nose bar height is adjusted while maintaining the two veneer exit gaps between the nose bar and the knife and between the nose bar and the knife backing member substantially the same as or slightly greater than the veneer peel path width which is equal to the veneer thickness plus a clearance space of a predetermined amount. The veneer lathe apparatus and method of the present invention achieve this by automatically adjusting the vertical position of the nose bar relative to the knife during peeling in response to a control signal produced by a digital computer corresponding to changes in the position of the knife carriage and resulting reductions in the log diameter during peeling.

The veneer lathe apparatus and method of the present invention have several advantages over the prior methods and apparatus discussed above, including production of veneer of higher quality by automatic adjustment of the height of the nose bar roll during peeling with computer control system. The automatic control system enables a faster, easier and more accurate adjustment of the nose bar height while maintaining the veneer exit gap width substantially the same as the veneer peel path width which is equal to the veneer thickness plus a clearance space of a predetermined amount. This automatic control of the nose bar height also has the advantage of enabling the nose bar roll to be positioned closer to the knife during the entire peel so that a more uniform, better quality of veneer can be produced. In addition, the computer has data tables stored in its memory that include height adjustment curves of data points each comprising a data pair corresponding to the desired heights of the nose bar relative to the knife for different knife carriage positions and corresponding log radii. The data tables include a plurality of height adjustment curves for different log temperatures. In addition, since the data tables are stored in the computer memory they: can be changed easily by computer data entry to compensate for different wood species, different veneer thicknesses or other variables, such as knife pitch angle.

Another advantage of the present invention is simple, accurate and trouble-free adjustment of the height of the nose bar roll during peeling using a moveable wedge device that is operated by a computer-controlled cylinder. The movable wedge slides on a fixed wedge that is manually adjusted to a set position before the beginning of peel. These wedges are provided with suitable guides to control their movement and to maintain the relative lateral positions of the wedges. In addition, a resilient hold-down device is employed for mounting the nose bar roll support on the nose bar carriage to enable the height adjustment of the nose bar support during peeling while preventing lifting of the nose bar support which tends to happen as a result of rotation of the nose bar roll while it is engaged by the log. The resilient hold-down device is provided with a resilient bias in a simple, economical and trouble-free manner by using a pressure-regulated oil cylinder that allows a hold-down plate which engages the nose bar support to move up and down along a guide pin during height adjustment.

SUMMARY OF THE INVENTION

It is therefore one object of the present invention to provide an improved veneer lathe apparatus and method of operation which automatically adjusts the height of the nose bar relative to the lathe knife during peeling to produce veneer of higher quality.

Another object of the invention is to provide such an improved veneer lathe apparatus and method employing a computer control for automatically adjusting the height of the nose bar roll relative to the knife during peeling to maintain the position of the nose bar roll closer to the knife for producing better quality of veneer.

A further object of the invention is to provide such a lathe apparatus and method in which the veneer exit gap width is maintained substantially the same as or slightly greater than the veneer peel path width which is equal to the veneer thickness plus a spacing distance of a predetermined amount, for more trouble-free operation.

A still further object of the invention is to provide such an improved lathe apparatus and method in which the height of a nose bar roll is adjusted in a simple, accurate and trouble-free manner by means of a moveable wedge device.

An additional object of the present invention is to provide an improved veneer lathe apparatus and method in which the nose bar roll support is held in position by a resilient hold-down device which enables height adjustment of the nose bar support during peeling while preventing the nose bar support from being lifted relative to the log during peeling.

Still another object of the invention is to provide such an improved lathe apparatus and method of operation in which the resilient hold-down device is provided with a resilient bias force in a simple and reliable manner by a fluid cylinder.

DESCRIPTION OF THE DRAWINGS

Other objects and advantages of the present invention will be apparent from the following detailed description of the preferred embodiment thereof and from the attached drawings of which.

DESCRIPTION OF THE PREFERRED EMBODIMENT

Figure 1:
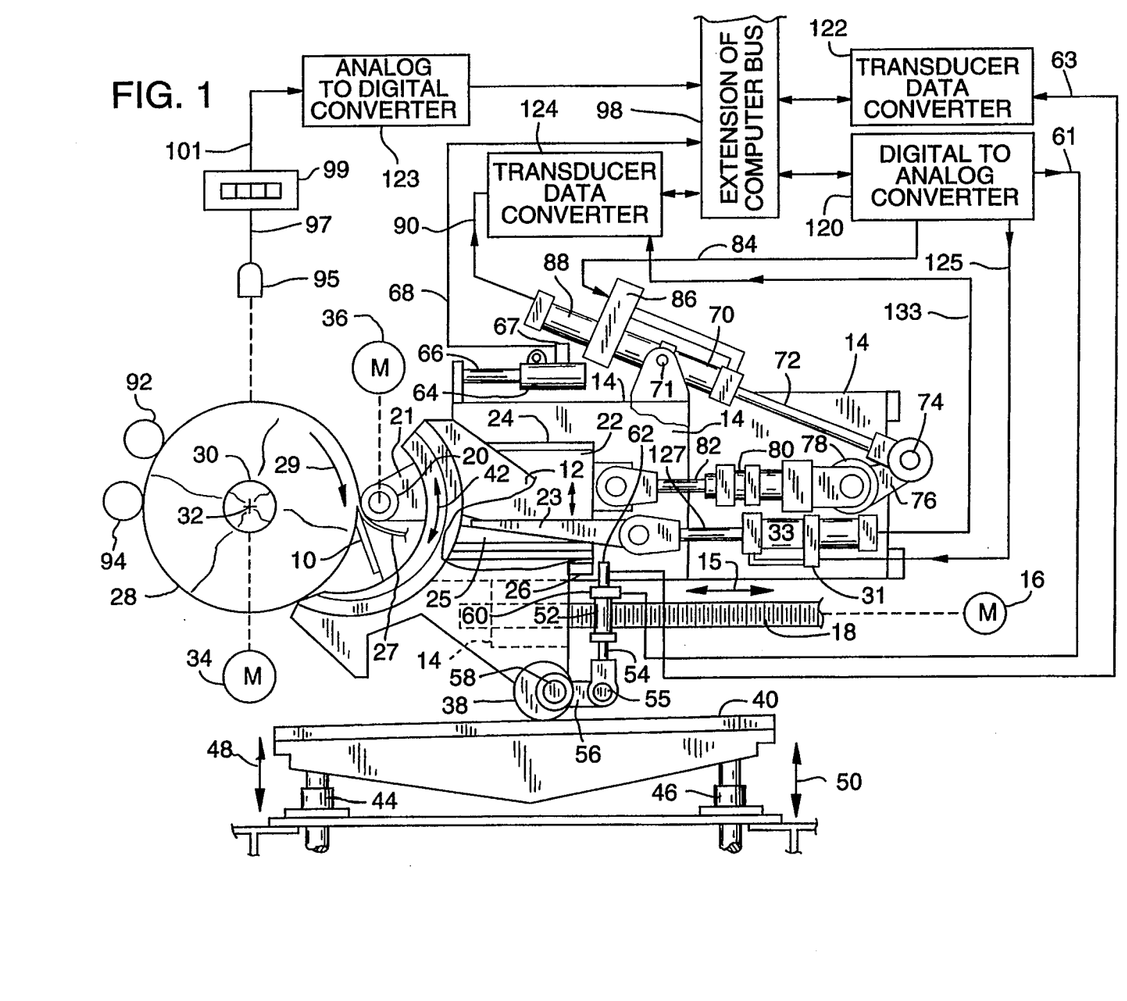
FIG. 1 is a partially diagrammatic side view of a veneer lathe apparatus and control system, in accordance with the present invention.

As shown in FIG. 1, one embodiment of the veneer lathe apparatus of the present invention includes a lathe knife 10 mounted on the knife carriage 12 for pivotal movement to adjust the pitch angle of such knife. The knife carriage 12 is pivotally mounted on a main carriage 14. The main carriage is moved in a horizontal direction 15 by an electric carriage motor 16 whose output shaft is geared to a pair of screw drives 18 at the opposite ends of the main carriage for moving the knife carriage and the knife blade 10 horizontally toward the log during the peeling of the veneer from the log. A nose bar roll 20 is mounted by support arms 21 on a nose bar carriage 22, which is also mounted on the main carriage 14. The nose bar carriage 22 is moved horizontally relative to the main carriage 14 for adjustment of the horizontal knife gap between the nose bar roll and the knife by sliding movement of the nose bar carriage along a pair of resilient biased hold-down plates 24 at the opposite end of the nose bar.

Figure 2A:
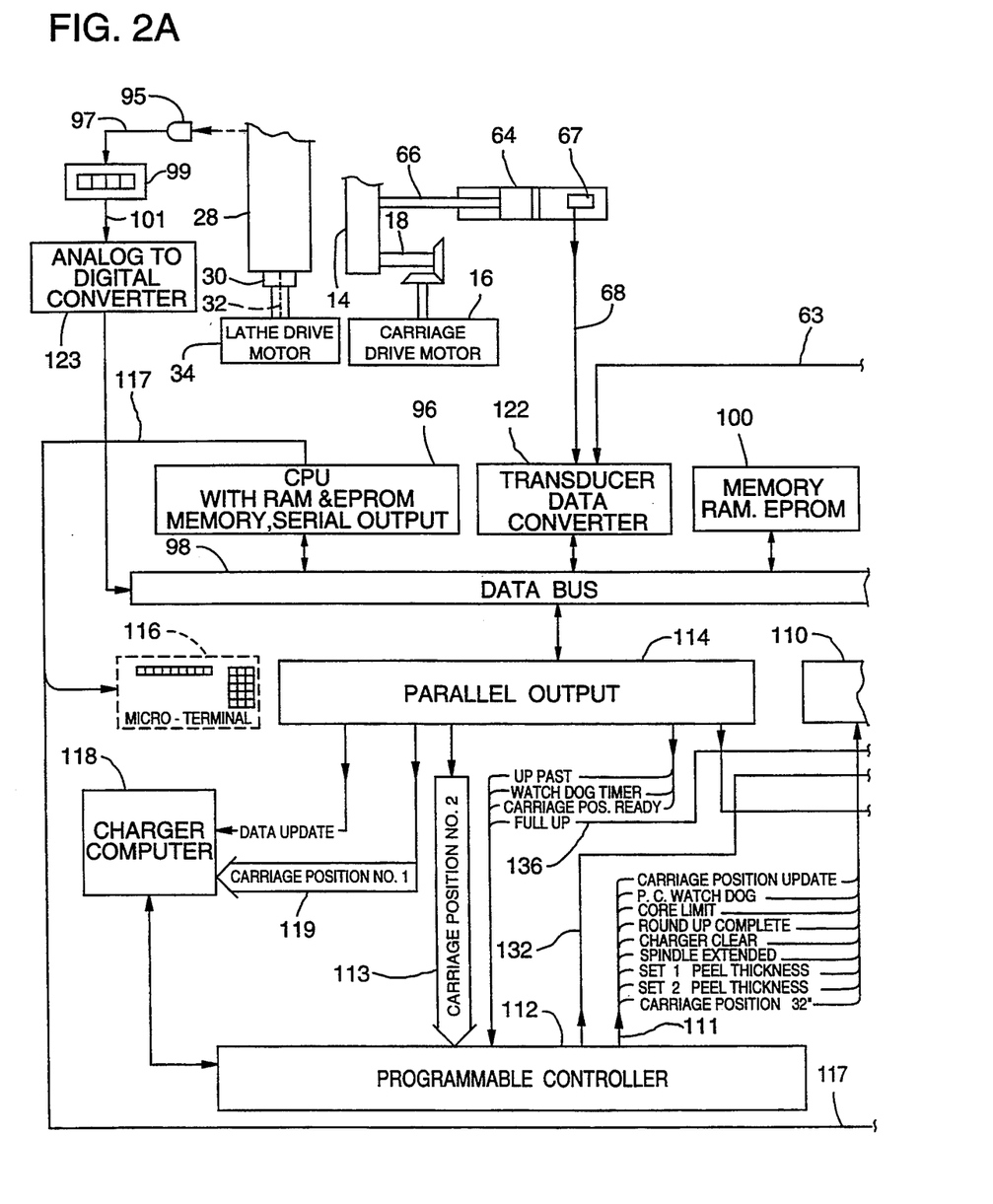
FIGS. 2A and 2B together form a diagram of the computer control system used for the apparatus of FIG. 1.
Figure 2B:
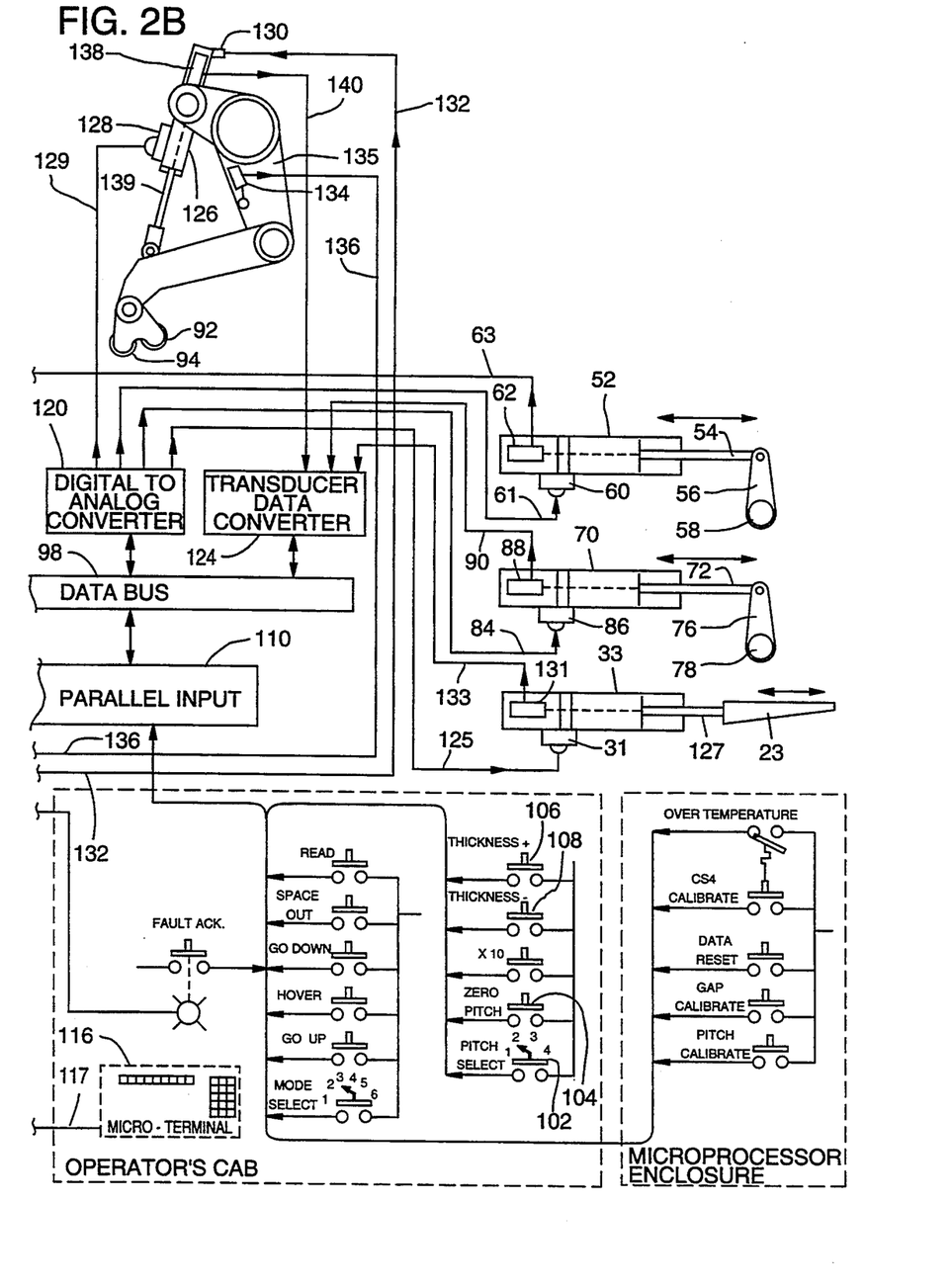

The nose bar carriage 22 is mounted on a movable wedge member 23 that slides relative to such carriage on a fixed wedge member 25 fixedly attached to the frame so that sliding movement of the moveable wedge member 26 adjusts the height of carriage 22 and the nose bar roll 20 in a manner hereinafter described. As a result, the height of the nose bar roll 20 above the knife 10 is automatically adjusted during peeling by movement of the wedge member 23 with an automatic control system including a digital computer as shown in FIGS. 2A and 2B. The computer produces a control signal that operates a servo valve 31 on a control cylinder 33 whose piston is connected to the moveable wedge 23 for height adjustment of the nose bar carriage. In addition, the horizontal gap between the nose bar roll and the knife is adjusted by horizontal movement of the nose bar support carriage 22 with a second control cylinder 70 also operated by the computer control system. This determines the thickness of the veneer 27 and maintains the nose bar roll in engagement with the log 28 at a position ahead of the knife blade as the log diameter reduces during peeling. The log is rotated in a clockwise direction 29 by lathe spindles 30 engaging the opposite ends of the log for rotation of such log about axis 32 as such spindles are driven by electric motor 34. It should be noted that the nose bar roller 20 may be driven by a second electric motor 36 in order to apply additional torque to the log for rotation during peeling.

Figure 3:
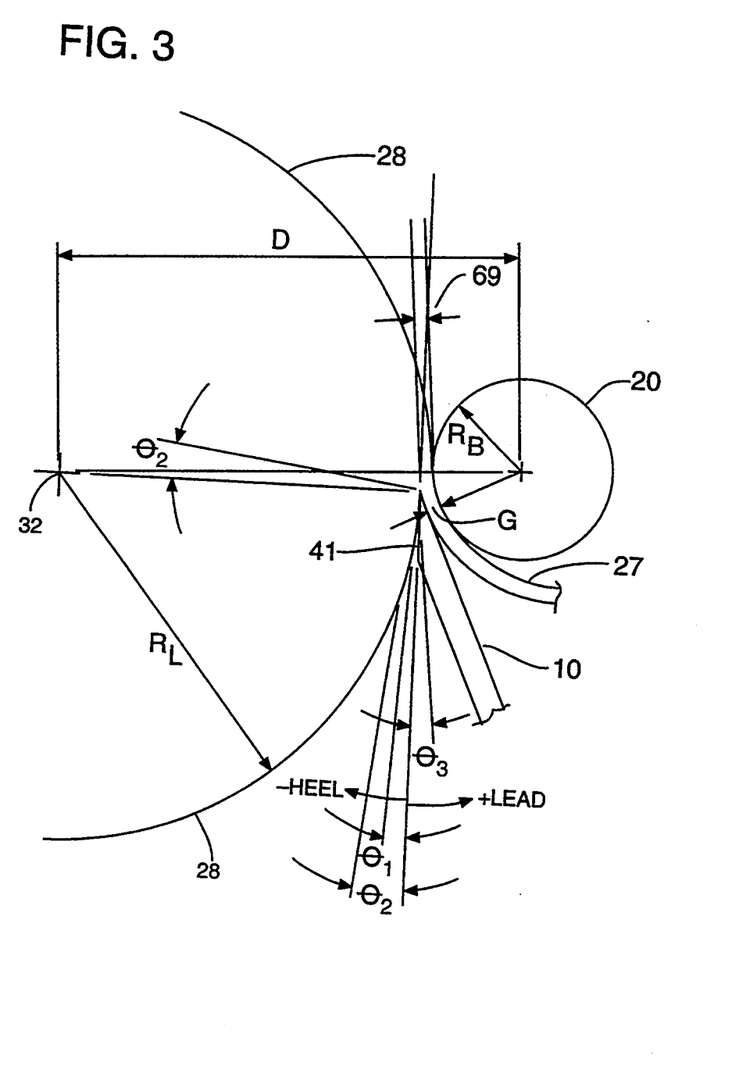
FIG. 3 is an enlarged view of a portion of the apparatus of FIG. 1 showing adjustment of the nose bar and the knife.

As described in U.S. Pat. No. 4,893,663, during peeling, the knife blade 10 is moved horizontally toward axis of rotation 32 of such block by movement of the main carriage 14 in the direction 15 with the motor 16 as the diameter of the block reduces. The knife carriage 12 is adjustably mounted on a cam follower roller 38, which rolls along a pitch rail cam member 40. The pitch rail 40 is provided with a predetermined slope so that as the cam follower roller 38 moves along such pitch rail, it causes the knife carriage 12 to pivot in the clockwise and counterclockwise directions of arrows 42 about the point of the knife blade 10. As a result of adjustment of the height of roller 38 on the knife carriage 12 and the slope of the rail 40, the pitch angle of the knife blade between the blade's front surface 41 and a vertical plane may be varied positively and negatively from an angle of zero degrees where the front surface of the knife blade is vertical, as shown in FIG. 3. The range of variation of the knife pitch angle is between a positive pitch angle or "lead" of up to +1 degrees in a clockwise direction away from the log and a negative angle or "heel" of up to about −5 degrees in a counterclockwise direction toward the log in FIG. 1 when the slope of the rail 40 is zero or parallel to the horizontal direction 15. Thus, the pitch angle of the knife blade is set by the slope of the pitch rail cam 40 and by the height of the cam follower roller 38 on the knife carriage 12. Rail 40 can be set to a background slope enabling total operating range of pitch adjust from +10 degrees to −10 degrees.

Normally, the pitch rail 40 has a constant slope, but it may be provided with an end portion of changing slope nearest the log which is greater than the slope of its other portion, as shown by element 120 in U.S. Pat. No. 4,708,180. However, different species of wood and different wood conditions of the same species require changes in the pitch profile for optimum yield of veneer of substantially uniform thickness and high quality. This pitch angle profile change for different species of wood is conventionally done manually by adjusting the slope of the pitch rail 40 before peeling through adjustment of a pair of threaded mounts 44 and 46 at the opposite ends of the pitch rail with wrenches or a manually controlled motor. Thus, the mounts are rotated to adjust the height of the pitch rail by raising or lowering the ends of such rail in the direction of arrows 48 and 50 in order to set the rail slope. This manual adjustment of the slope of the pitch rail is slow and inaccurate, resulting in lower-quality veneer and reduced production. The electrical control system of the present invention overcomes this problem by allowing rapid selection between a plurality of predetermined pitch profiles stored in the computer memory as pitch data tables which can be easily changed by inputting new data with the computer terminal, as hereinafter described.

The electrical control system for adjusting the knife pitch angle includes a pitch adjustment cylinder 52 fixed at its upper end to the main carriage 14. The piston rod 54 of the pitch adjustment cylinder is pivotally connected at pivot 55 to one end of a lever arm 56 to rotate such lever arm. The lever arm 56 is connected at its other end to the shaft of an eccentric 58 which causes the center of the cam follower roller 38 to orbit about the axis of the eccentric to raise such cam follower roller to different heights on the knife carriage 12 in response to pivotal rotation of the level arm of about 90 degrees or less by the pitch adjust cylinder 52. These adjustments of the height of the cam follower roller 38 on the knife carriage 12 cause such knife carriage to rotate the knife to different angles corresponding to such heights at any given position along the pitch rail 40. Thus, by adjusting the height of the cam follower roller 38 on the knife carriage 12, several different effective pitch profiles are provided for a given pitch rail 40 to change the pitch angle of the knife blade in accordance with different wood species and different wood conditions in a fast, accurate manner.

The pitch adjustment cylinder 52 is controlled by a servo valve 60, which is operated by the pitch control output signal at output terminal 61 of a digital computer in the computer control system of FIG. 2 as hereinafter discussed. The position of the piston rod 54 in the pitch adjustment cylinder 52 corresponding to the height of the cam follower roller 38 is sensed by a transducer 62 to produce a height output signal which is applied to input terminal 63 of the computer control system. A main lathe carriage position cylinder 64, fixed to the frame of the lathe and whose movable piston rod 66 is connected to the main carriage 14 for movement with such carriage, causes a transducer 67 coupled to such piston rod to produce a main carriage position signal corresponding to the log block radius. This main carriage position signal is applied to an input 68 of the computer to indicate the log radius or the position of the knife blade 10 relative to the axis of rotation 32 of the log during peeling. The transducers 67 and 62 may be sonic pulse waveguide transducers of the Temposonics-type described in U.S. Pat. No. 4,708,180.

The horizontal knife gap 69 between the front surface 41 of the knife blade 10 and the nose bar roll 20 shown in FIG. 3 may also be automatically adjusted by the computer in response to changes in diameter of the log block 28 and changes in knife pitch by means of a gap adjustment cylinder 70 mounted at pivot 71 on the main carriage 14. The piston rod 72 of such cylinder is pivotally connected at pivot 74 to a lever arm 76 which rotates an eccentric 78 that is pivotally attached to a second cylinder 80 to adjust the nose bar to knife horizontal gap. The second cylinder 80 has its piston rod 82 connected to the nose bar carriage 22 for reciprocating the nose bar roll 20 between the contact position shown in FIG. 1 with such roll in contact with the log during peeling, and a retracted position in which the roll is removed from contact with the log to allow loading of new logs into the lathe. The horizontal gap between the nose bar roll 20 and the knife blade 10 is adjusted during peeling by means of the gap adjust cylinder 70 in response to gap control signals transmitted from a computer output 84 to a servo valve 86 controlling the cylinder 70. A horizontal gap spacing transducer 88 is attached to the gap adjustment cylinder 70 in order to sense the position of the position rod 72 in such cylinder which corresponds to the gap spacing between the knife blade and the nose bar roll 20. The transducer 88 produces a horizontal gap spacing output signal which is applied to an input terminal 90 of the computer.

The operation of such nose bar roll to knife horizontal gap adjustment in response to reduction in the diameter of the log block during peeling is described in greater detail in U.S. Pat. No. 4,708,180 of Browning et al., issued Nov. 24, 1987.

It should be noted that a pair of back-up idler rolls 92 and 94 may be provided which are moved into contact with the surface of the log block 28 on an opposite side thereof from the knife blade 10 and the nose bar roll 20 when the log block has been peeled to a small diameter on the order of about 8″. Thus, the back-up rolls 92 and 94 prevent the bending of log blocks of small diameter during peeling due to the pressure of the knife and nose bar. Alternatively, the back-up idler rolls 92 and 94 of FIG. 1 may be replaced with the core drive rolls 92′ and 94′ which may be driven by a motor to supply auxiliary power for rotating the log so that such rolls operate as "core drive" rolls. The motor-driven back-up roll 92′ may be radially and angularly adjusted during peeling relative to the other back-up roll 94′ which is an idler, as shown in U.S. Pat. No. 4,380,259 of Brookhyser et al., issued Apr. 19, 1983. The back-up rolls, whether they are back-up idler rolls or core drive rolls, are moved radially toward the center of rotation 32 of the log block during peeling with automatic adjustment by the computer in response to reduction of the diameter of such log. Also, the back-up rolls may be provided with offset temperature adjustments in a radial direction either toward or away from such center, depending on the surface temperature of the log, as hereinafter described.

A temperature sensor device 95 is mounted above the side of the log 28 at the middle of such log to sense the infrared radiation emitted from the surface of such log and thereby determine the surface temperature of the log during peeling as shown in FIG. 1. The temperature sensor device 95 produces an electrical control signal on its output terminal 97, whose amplitude corresponds to the temperature of the log. This control signal is transmitted through a temperature display device 99 which displays the value of such log temperature, to an input terminal 101 of the computer for providing an offset adjustment to the knife gap and the knife pitch angle adjustment by such computer in a manner hereinafter described.

A computer control system for adjusting the nose bar height, the lathe knife pitch angle and the knife gap in accordance with the present invention is shown in FIGS. 2A and 2B. Such computer control system includes a central processing unit (CPU) 96 of a general purpose digital computer which contains a digital data memory including a random access memory (RAM) and an electronic programmable read-only memory (EPROM) in which the computer program for operating such system is stored. The CPU 96 is connected by a serial output to a data bus 98 including parallel lines having a plurality of inputs and outputs. A digital data storage memory 100, consisting of a RAM and an EPROM is employed to store the data of several knife pitch angle profiles, horizontal knife gap adjustment curves, and back-up roll adjustment curves for different species of wood, as shown in U.S. Pat. No. 4,893,663 and also nose bar height adjustment curves as hereinafter described.

Figure 4:
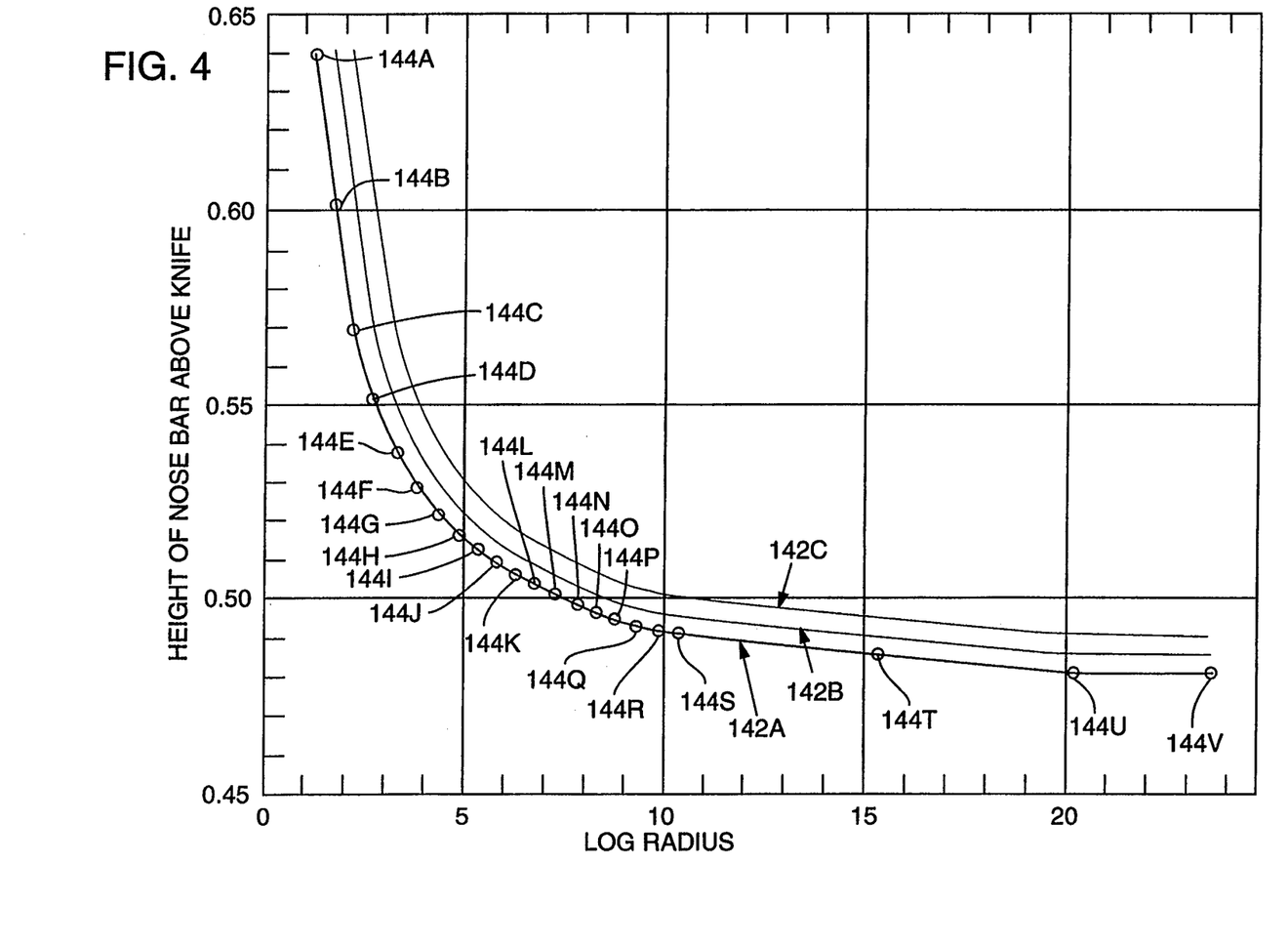
FIG. 4 shows the nose bar height adjustment curves stored in the computer memory of the control system.

A family of nose bar height adjustment curves for different log temperatures, such as three curves 142A, 142B and 142C corresponding to 100° F., 120° F., and 140° F. shown in FIG. 4 for a veneer thickness of 0.200", are stored in the computer memory 100. The nose bar height adjustment curves are each formed by 30 data pair points including points 144A to 144V stored in memory with each data pair consisting of a bar height and a log block radius for that height. Each curve 142 is for a given veneer peel thickness and predetermined peel clearance spacing. It should be noted, for example, that for a normal block temperature of 100° F., a peel thickness of 0.110" and peel clearance spacing of 0.020" the nose bar height curve (not shown) increases from a minimum of 0.440" at a log radius of 23.750" to a maximum of 0.613" at a log radius of 1.250" when peeling fir or other softwood species. However, for a peel thickness of 0.200" and a clearance spacing of 0.020", the nose bar height curve 142A of FIG. 4 increases from a minimum of 0.480" at a log radius of 23.750" to a maximum of 0.640" at a log radius of 1.250". The following two tables give the lathe data points for two peel thicknesses of 0.110" and 0.200" both having a clearance spacing of 0.020" and a lathe knife bevel angle of 22.62 degrees.

TABLE 1

Peel thickness = 0.11"
Minimum exit gap clearance = 0.02"
Lathe knife bevel angle = 22.62"
Knife backing plate angle = 50.00 degrees
Knife tip to backing plate straight line intersection = 0.85"
Carriage Position Range 1.25"–24.00" with 0.50" increment.

| Carriage Position (inches) | Knife Angle (degrees) | Roller Bar Height (inches) | Horizontal Gap (inches) | Exit Gap To Knife (inches) | Exit Gap To Backing Plate (inches) |
|---|---|---|---|---|---|
| 1.250 | −2.500 | 0.613 | 0.041 | 0.130 | 0.218 |
| 1.750 | −1.833 | 0.576 | 0.057 | 0.130 | 0.199 |
| 2.250 | −0.967 | 0.545 | 0.070 | 0.130 | 0.184 |
| 2.750 | −0.650 | 0.528 | 0.077 | 0.130 | 0.175 |
| 3.250 | −0.438 | 0.516 | 0.082 | 0.130 | 0.169 |
| 3.750 | −0.312 | 0.507 | 0.086 | 0.130 | 0.165 |
| 4.250 | −0.240 | 0.501 | 0.088 | 0.130 | 0.162 |
| 4.750 | −0.219 | 0.496 | 0.090 | 0.130 | 0.159 |
| 5.250 | −0.198 | 0.492 | 0.092 | 0.130 | 0.157 |
| 5.750 | −0.177 | 0.489 | 0.093 | 0.130 | 0.156 |
| 6.250 | −0.156 | 0.486 | 0.095 | 0.130 | 0.154 |
| 6.750 | −0.135 | 0.483 | 0.096 | 0.130 | 0.153 |
| 7.250 | −0.115 | 0.481 | 0.097 | 0.130 | 0.152 |
| 7.750 | −0.094 | 0.479 | 0.098 | 0.130 | 0.151 |
| 8.250 | −0.073 | 0.477 | 0.098 | 0.130 | 0.150 |
| 8.750 | −0.052 | 0.475 | 0.099 | 0.130 | 0.149 |
| 9.250 | −0.031 | 0.473 | 0.100 | 0.130 | 0.148 |
| 9.750 | −0.010 | 0.472 | 0.100 | 0.130 | 0.147 |
| 10.250 | 0.025 | 0.470 | 0.101 | 0.130 | 0.146 |
| 10.750 | 0.075 | 0.468 | 0.102 | 0.130 | 0.145 |
| 11.250 | 0.125 | 0.467 | 0.103 | 0.130 | 0.145 |
| 11.750 | 0.175 | 0.465 | 0.103 | 0.130 | 0.144 |
| 12.250 | 0.225 | 0.463 | 0.104 | 0.130 | 0.143 |
| 12.750 | 0.275 | 0.462 | 0.105 | 0.130 | 0.142 |
| 13.250 | 0.325 | 0.460 | 0.105 | 0.130 | 0.141 |
| 13.750 | 0.375 | 0.459 | 0.106 | 0.130 | 0.141 |
| 14.250 | 0.425 | 0.457 | 0.107 | 0.130 | 0.140 |
| 14.750 | 0.475 | 0.456 | 0.107 | 0.130 | 0.139 |
| 15.250 | 0.525 | 0.454 | 0.108 | 0.130 | 0.138 |
| 15.750 | 0.575 | 0.453 | 0.108 | 0.130 | 0.138 |
| 16.250 | 0.625 | 0.452 | 0.109 | 0.130 | 0.137 |
| 16.750 | 0.675 | 0.450 | 0.109 | 0.130 | 0.136 |
| 17.250 | 0.725 | 0.449 | 0.110 | 0.130 | 0.136 |
| 17.750 | 0.775 | 0.448 | 0.111 | 0.130 | 0.135 |
| 18.250 | 0.825 | 0.446 | 0.111 | 0.130 | 0.135 |
| 18.750 | 0.875 | 0.445 | 0.112 | 0.130 | 0.134 |
| 19.250 | 0.925 | 0.444 | 0.112 | 0.130 | 0.133 |
| 19.750 | 0.975 | 0.443 | 0.113 | 0.130 | 0.133 |
| 20.250 | 1.000 | 0.442 | 0.113 | 0.130 | 0.132 |
| 20.750 | 1.000 | 0.442 | 0.113 | 0.130 | 0.132 |
| 21.250 | 1.000 | 0.442 | 0.113 | 0.130 | 0.132 |
| 21.750 | 1.000 | 0.441 | 0.113 | 0.130 | 0.132 |
| 22.250 | 1.000 | 0.441 | 0.113 | 0.130 | 0.132 |
| 22.750 | 1.000 | 0.441 | 0.113 | 0.130 | 0.132 |
| 23.250 | 1.000 | 0.441 | 0.114 | 0.130 | 0.132 |
| 23.750 | 1.000 | 0.440 | 0.114 | 0.130 | 0.131 |

TABLE 2

Peel thickness = 0.20"
Minimum exit gap clearance = 0.02"
Lathe knife bevel angle = 22.62"
Knife backing plate angle = 50.00 degrees
Knife tip to backing plate straight line intersection = 0.85"
Carriage Position Range 1.25"–24.00" with 0.50" increment.

| Carriage Position (inches) | Knife Angle (degrees) | Roller Bar Height (inches) | Horizontal Gap (inches) | Exit Gap To Knife (inches) | Exit Gap To Backing Plate (inches) |
|---|---|---|---|---|---|
| 1.250 | −2.500 | 0.640 | 0.128 | 0.220 | 0.294 |
| 1.750 | −1.833 | 0.601 | 0.144 | 0.220 | 0.274 |
| 2.250 | −0.967 | 0.569 | 0.158 | 0.220 | 0.258 |
| 2.750 | −0.650 | 0.551 | 0.165 | 0.220 | 0.249 |
| 3.250 | −0.438 | 0.538 | 0.170 | 0.220 | 0.243 |
| 3.750 | −0.312 | 0.529 | 0.174 | 0.220 | 0.238 |
| 4.250 | −0.240 | 0.522 | 0.177 | 0.220 | 0.235 |
| 4.750 | −0.219 | 0.517 | 0.179 | 0.220 | 0.233 |
| 5.250 | −0.198 | 0.513 | 0.181 | 0.220 | 0.230 |
| 5.750 | −0.177 | 0.510 | 0.182 | 0.220 | 0.229 |
| 6.250 | −0.156 | 0.506 | 0.184 | 0.220 | 0.227 |

Peel thickness = 0.20"
Minimum exit gap clearance = 0.02"
Lathe knife bevel angle = 22.62"
Knife backing plate angle = 50.00 degrees
Knife tip to backing plate straight line intersection = 0.85"
Carriage Position Range 1.25"–24.00" with 0.50" increment.

| Carriage Position (inches) | Knife Angle (degrees) | Roller Bar Height (inches) | Horizontal Gap (inches) | Exit Gap To Knife (inches) | Exit Gap To Backing Plate (inches) |
|---|---|---|---|---|---|
| 6.750 | −0.135 | 0.504 | 0.185 | 0.220 | 0.226 |
| 7.250 | −0.115 | 0.501 | 0.186 | 0.220 | 0.224 |
| 7.750 | −0.094 | 0.499 | 0.187 | 0.220 | 0.223 |
| 8.250 | −0.073 | 0.497 | 0.188 | 0.220 | 0.222 |
| 8.750 | −0.052 | 0.495 | 0.188 | 0.220 | 0.221 |
| 9.250 | −0.031 | 0.493 | 0.189 | 0.220 | 0.221 |
| 9.750 | −0.010 | 0.492 | 0.190 | 0.220 | 0.220 |
| 10.250 | 0.025 | 0.491 | 0.190 | 0.221 | 0.220 |
| 10.750 | 0.075 | 0.491 | 0.191 | 0.221 | 0.220 |
| 11.250 | 0.125 | 0.490 | 0.192 | 0.221 | 0.220 |
| 11.750 | 0.175 | 0.490 | 0.193 | 0.222 | 0.220 |
| 12.250 | 0.225 | 0.489 | 0.193 | 0.222 | 0.220 |
| 12.750 | 0.275 | 0.488 | 0.194 | 0.223 | 0.220 |
| 13.250 | 0.325 | 0.488 | 0.195 | 0.223 | 0.220 |
| 13.750 | 0.375 | 0.487 | 0.195 | 0.223 | 0.220 |
| 14.250 | 0.425 | 0.487 | 0.196 | 0.224 | 0.220 |
| 14.750 | 0.475 | 0.486 | 0.197 | 0.224 | 0.220 |
| 15.250 | 0.525 | 0.486 | 0.197 | 0.225 | 0.220 |
| 15.750 | 0.575 | 0.485 | 0.198 | 0.225 | 0.220 |
| 16.250 | 0.625 | 0.485 | 0.198 | 0.225 | 0.220 |
| 16.750 | 0.675 | 0.484 | 0.199 | 0.226 | 0.220 |
| 17.250 | 0.725 | 0.484 | 0.200 | 0.226 | 0.220 |
| 17.750 | 0.775 | 0.483 | 0.200 | 0.226 | 0.220 |
| 18.250 | 0.825 | 0.483 | 0.201 | 0.227 | 0.220 |
| 18.750 | 0.875 | 0.482 | 0.201 | 0.227 | 0.220 |
| 19.250 | 0.925 | 0.482 | 0.202 | 0.227 | 0.220 |
| 19.750 | 0.975 | 0.481 | 0.202 | 0.228 | 0.220 |
| 20.250 | 1.000 | 0.481 | 0.203 | 0.228 | 0.220 |
| 20.750 | 1.000 | 0.481 | 0.203 | 0.228 | 0.220 |
| 21.250 | 1.000 | 0.481 | 0.203 | 0.228 | 0.220 |
| 21.750 | 1.000 | 0.481 | 0.203 | 0.228 | 0.220 |
| 22.250 | 1.000 | 0.481 | 0.203 | 0.228 | 0.220 |
| 22.750 | 1.000 | 0.481 | 0.203 | 0.228 | 0.220 |
| 23.250 | 1.000 | 0.481 | 0.203 | 0.228 | 0.220 |
| 23.750 | 1.000 | 0.480 | 0.204 | 0.228 | 0.220 |

Four different families of pitch profiles may be stored in the computer memory 100 and selectively accessed by the computer control system with a pitch selection switch 102. The pitch selection switch has four different switch positions corresponding to such four families of pitch rail profile tables. In addition, a zero pitch angle control switch 104 is provided to calibrate the pitch adjust system to the front face bevel 41 ground into knife 10, as well as two veneer thickness adjustment settings 106 and 108. These switches all supply input signals through a parallel input circuit 110 and the data bus 98 to the computer. Peel thickness signals "set 1 peel thickness" and "set 2 peel thickness" corresponding to two different base veneer thicknesses, such as 0.110" and 0.200", are transmitted from output 111 of a programmable controller 112 through the parallel input 110 to the CPU 96. Such programmable controller also receives input information from the computer, such as the knife "carriage position No. 2" signal at input 113, through a parallel output circuit 114. The thickness adjustment switches 106 and 108 are for "fine tuning" adjustment of the horizontal knife gap between the knife blade and the nose bar roll for a selected veneer thickness in order to compensate for knife dullness and other lathe variables. In addition for calibration purposes four switches are shown in FIG. 2B to calibrate the back-up roll cylinder 126, the horizontal gap cylinder 70 and the pitch adjust cylinder 52 as well as the height adjust cylinders 33. A computer terminal 116 is provided for manual input of data and for displaying output information gathered by the computer, such terminal being connected by lead 117 to the central processing unit 96.

A lathe charger computer 118 may also be provided for controlling the measurement and centering of logs in a lathe charger (not shown) and for transmitting such logs into the lathe with such lathe charger. Charger computer 118 does not control the knife pitch adjustment. However, such charger computer may be connected to the parallel output circuit 114 of the above-described computer, including CPU 96, to receive control signals including lathe "carriage position No. 1" signal at input 119 so that the veneer lathe charger does not transfer logs into the lathe until peeling of the previous log is finished and the main lathe carriage has been retracted far enough to allow clearance for loading next log.

As shown in FIGS. 2A and 2B, the pitch adjustment cylinder 52 has its servo control valve 60 connected to the output 61 of a digital-to-analog converter 120 of the computer control which converts the digital data received from the computer corresponding to a pitch rail profile table stored in memory 100 into an analog pitch adjustment signal. The pitch adjustment signal causes the pitch adjustment cylinder 52 to rotate the pitch adjustment eccentric 58 to change the height of the cam follower roller 38 on the knife carriage 12 to the proper value of the desired pitch angle for the log diameter corresponding to the position of such cam follower roller on the pitch rail 40. The transducer 62 of the pitch adjustment cylinder 52 transmits a height position signal corresponding to the position of the piston rod 54 to input 63 of a transducer data converter 122. From this transducer signal, the computer can determine when the selected height of the cam follower roller corresponding to the desired pitch angle is reached and then terminate the pitch adjustment signal applied to valve 60. Thus, a closed-loop feedback control system is provided.

It should be noted that the position of the main carriage 14 corresponding to the distance of the knife blade 10 from the axis of rotation 32 of the log or to the radius of such log is provided by an output signal of the position transducer 67 of the carriage position cylinder 64. The main carriage position signal is transmitted from the transducer 67 to input 68 of the transducer data converter 122. This main carriage position signal enables the CPU to determine the knife pitch angle from the selected pitch profile table stored in the memory 100 which has been selected by the pitch select switch 102 and by the temperature offset adjustment control signal produced by the temperature sensor device 95 corresponding to the log surface temperature. The temperature offset adjustment control signal is applied at computer input 101 to an analog-to-digital converter 123 whose output is connected to the CPU 96 through bus 98.

The knife gap adjustment cylinder 70 is also provided with a servo valve 86 connected to the output 84 of the digital-to-analog converter 120 which is coupled through the data bus 98 to the CPU 96. As a result, the knife gap control cylinder 70 is caused by the computer to rotate lever arm 76 and the eccentric 78 to adjust the horizontal gap between the nose bar roll 20 and the knife blade 10 in accordance with the radius of the log block 28 being peeled which is determined from the output 68 of the main carriage transducer 67 that is applied to the transducer data converter 122, as discussed above. A knife gap spacing transducer 88 coupled to the piston rod 72 of the nose bar roll gap cylinder 70 produces a gap spacing signal which is applied to input 90 of the transducer data converter 124. The converter 124 applies the gap spacing signal through the data bus 98 to the CPU 96 which, when the desired gap spacing is reached, terminates the gap adjustment signal applied to valve 86. Thus, the nose bar roll gap is also adjusted by a closed-loop control system.

The computer CPU 96 also processes the temperature offset adjustment control signal produced at the output of the log temperature sensor device 95 in order to select the proper knife gap adjustment curve or the proper nose bar height adjustment curve for the sensed temperature from the family of knife gap curves and nose bar height curves which are stored in the memory 100. This causes an offset adjustment signal to be applied by the computer to the servo valve 86 of the knife gap adjustment cylinder 70 and to the servo valve 31 of the nose bar height adjustment cylinder 33 in order to adjust the gap or nose bar height for changes in log surface temperature.

As shown in FIG. 2B, the nose bar height relative to the knife is adjusted by the height adjustment cylinder 33 in response to a height control signal produced on an output 125 of the digital to analog converter 120 of the computer control system in response to changes in the log core radius during peeling. The height control signal is applied to the servo valve 31 of the height adjustment cylinder 33 for movement of the movable wedge 23 connected to the piston rod 127 of such cylinder to change the height of the nose bar carriage 22 and nose bar roll 20. The position of such piston rod 127 in cylinder 33 corresponding to the height of the nose bar roll 20 is sensed by a transducer 131 in cylinder 33 to produce a height position signal. The height position signal is applied to input 133 of transducer data converter 124 whose output is connected to computer 96 through the computer bus 98.

Back-up idler rolls 92 and 94 may be moved into engagement with the log block 28 after such log block has been peeled to a small diameter of, for example, about 8" diameter by an actuation cylinder 126 controlled by a servo valve 128 connected to an output 129 of the digital-to-analog converter 120. Thus, the servo valve 128 controls the cylinder 126 in response to a computer output signal to move the back-up rolls 92 and 94 into engagement with the log when it reaches a diameter of 8". The cylinder 126 continues to adjust the radial position and to move the back-up rolls toward the axis of rotation 34 of such log in response to a computer output control signal as the radius of the log decreases during peeling until peeling stops. At this time, a control signal is generated by the controller 112 and applied to fast-up valve 130 connected to actuation cylinder 126 to quickly raise the back-up rolls to the retracted or full-up position, thereby allowing a new log to be loaded into the veneer lathe. A full-up limit switch 134 is provided on a support arm 135 for the back-up rolls to produce an output signal which is applied at an input 136 of the programmable controller to tell it that the back-up rolls have reached the full-up position. A transducer 138 produces a back-up roll position signal corresponding to the position of the piston rod 139 of actuation cylinder 126 and supplies such position signal at computer input 140 to the transducer data converter 124. This tells the computer the position of the back-up rolls relative to the axis of rotation of the log so they are maintained in contact with the surface of the log at the proper pressure during peeling.

The radial position of the idler back-up rolls 92 and 94 relative to the log center 32 is adjusted by the computer in response to the surface temperature of the log which is sensed by the temperature sensor device 95 to produce a temperature offset control signal at computer input 101 in a similar manner to the knife gap adjustment previously discussed.

Figures 5, 6:
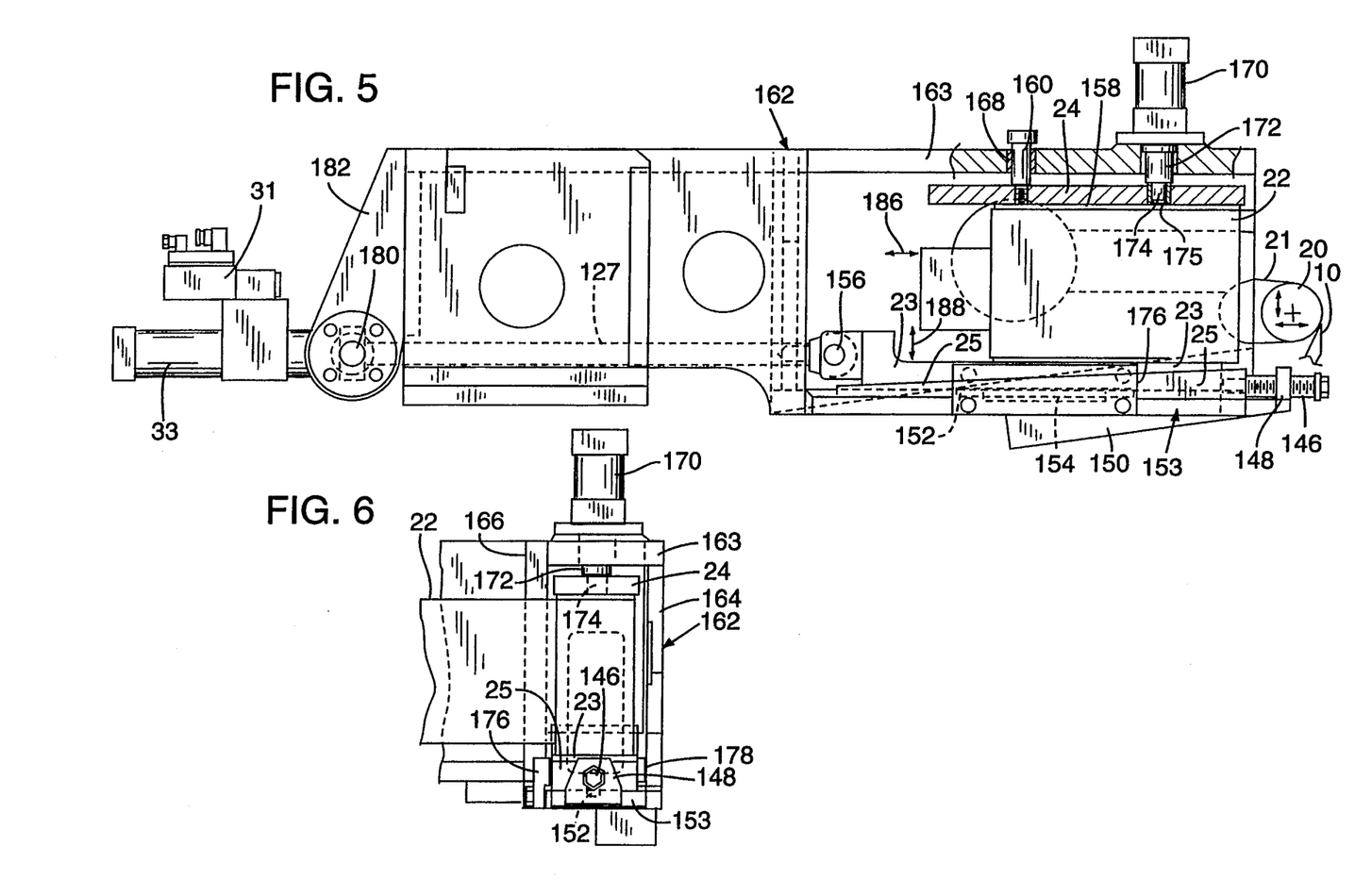
FIG. 5 is a side view of the nose bar height adjustment mechanism of the lathe apparatus of FIG. 1.
FIG. 6 is a front view of the mechanism of FIG. 5 with the nose bar removed for clarity.
Figure 7:
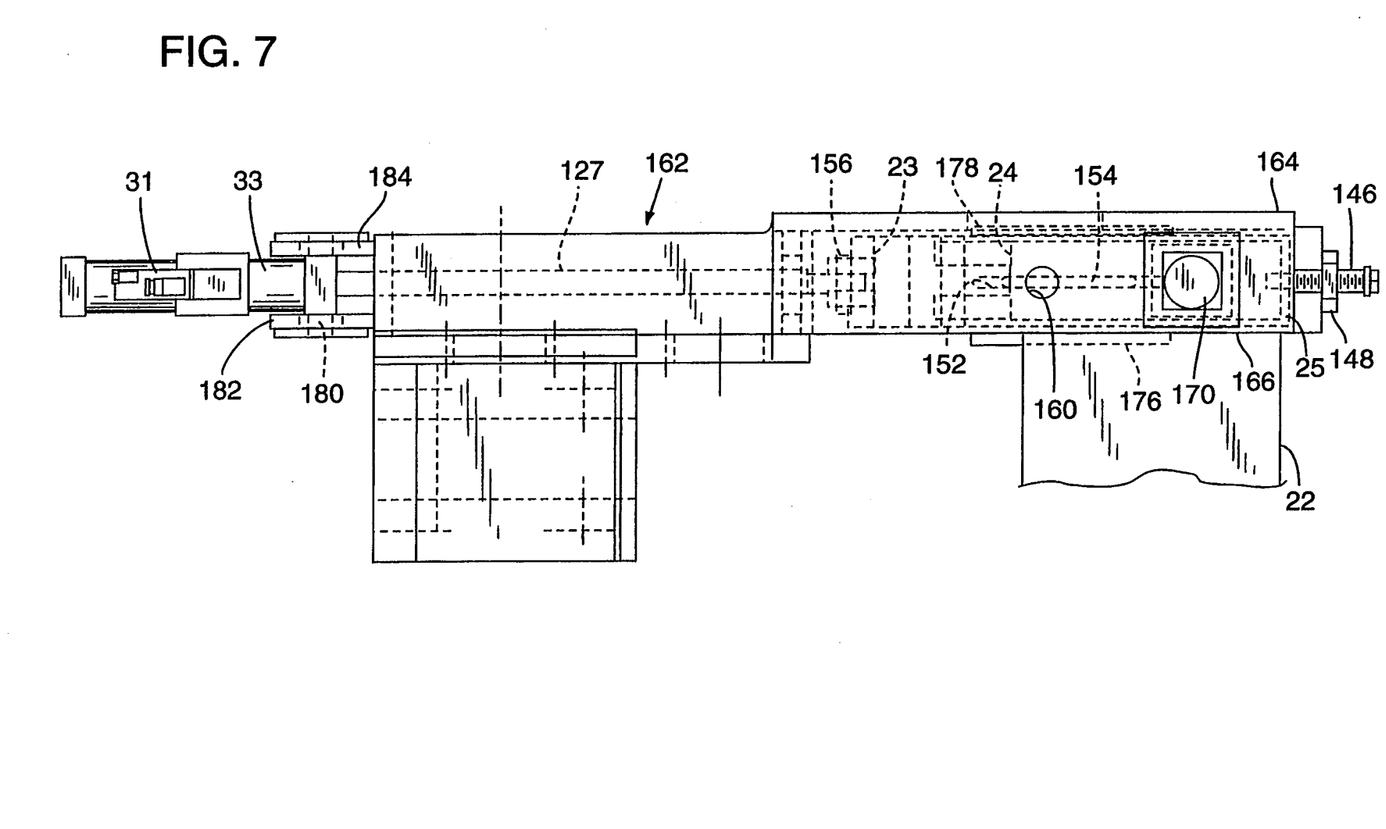
FIG. 7 is a top view of the mechanism of FIGS. 5 and 6.

As shown in FIGS. 5, 6 and 7, the nose bar roll height adjustment mechanism includes fixed wedge 25 which is mechanically adjusted to a preset position prior to peeling by rotation of an adjustment bolt 146. One end of the adjustment bolt 146 is fixed to the right end of the fixed wedge 25 and threaded through a collar 148 that is fixed to the main carriage 14 by a tab 150 which is welded to such main carriage. The fixed wedge 25 is provided with a key way slot 152 in the bottom surface thereof, which engages an elongated key 142 bolted to a fixed support plate 153 on which the fixed wedge slides. Thus, the fixed wedge is manually adjusted along the key to a set position prior to peeling. The movable wedge 23 is moved along the top surface of the fixed wedge during peeling to adjust the height of the nose bar carriage 22 and nose bar roll 20 by the height adjust cylinder 33 and piston 127, which is connected to such movable wedge at pivot connection 156.

The nose bar carriage 22 to which the nose bar 20 is attached by nose bar support arms 21, is mounted for horizontal sliding movement on the main carriage 14 to enable the horizontal gap between the nose bar roll 20 and the knife blade 10 to be adjusted by means of the gap adjustment cylinder 70 as discussed above and shown in FIG. 1. In addition, the nose bar carriage 22 is resiliently mounted on the main carriage 14 to enable vertical height adjustment of such nose bar carriage by movement of the adjustable wedge 23. Such height adjustment of the nose bar carriage 22 is enabled by the resiliently, mounted hold-down member 24 that engages the top surface 158 of nose bar carriage 22 whose bottom engages the top of the movable wedge 23, as shown in FIG. 5. The resilient hold-down member 24 is fixedly connected to a guide pin 160 that slides through a hole in the top of a U-shaped channel member 162. The top member 163 of the U-shaped channel member is fixed in any suitable manner, such as by welding, to a pair of side plates 164, 166, as shown in FIG. 6. Two channel members 162 are fixed by tabs 150 to the main carriage 14 to support the opposite ends of nose bar carriage 22. It should be noted that the inner side member 166 is provided with an opening through which the nose bar carriage 22 extends to a position beneath the resilient hold-down member 24 and above the adjustable wedge 23 which is mounted within the U-shaped channel member 162. The guide pin 160 slides through a sleeve bushing 168 of nylon or other suitable plastic provided within the guide hole in the top plate 163 of the channel member. A resilient bias cylinder 170 is mounted on the top plate 163 of the channel member so that its piston rod 172 engages the top of the hold-down plate 24 to resiliently urge such hold-down plate in a downward direction. The bottom end portion 174 of the piston rod 172 of smaller diameter fits within an opening 175 in the hold-down plate 124 to serve as a locator guide to maintain the piston rod at the proper position on the hold-down plate. The resilient bias cylinder 170 may be an oil cylinder connected to a pressure-regulated source of oil which may be adjusted to control the amount of resilient force applied to the hold-down plate 24.

As a result, two hold-down plates 24 resiliently engage the opposite ends of the nose bar carriage 22 and hold it in position but allow height adjustment of such nose bar carriage by means of the adjustable wedge 23 during peeling. A pair of guide plates 176, 178 are provided on opposite sides of the wedges 23, 25 to guide the longitudinal movement of moveable wedge 23 during its adjustment by control cylinder over the top of the fixed wedge 25, as shown in FIGS. 6 and 7. As stated previously, the fixed wedge 25 is guided in its manual adjustment by bolt 146 to a set position for movement along the key way 152 by the key 154. As a result, the wedges are centered within the U-shaped channel member 162 in a position directly below the resilient hold-down plate 24 to accurately adjust the height of the nose bar carriage 22 so that the nose bar roll 20 is properly vertically positioned relative to the tip of the knife 10. The height adjustment cylinder 33 is pivotally connected by a mounting pivot 180 between a pair of bracket arms 182, 184 attached to the opposite sides 166, 164 of the U-shaped channel member 162 as shown in FIG. 7. This enables the piston rod 127 of such cylinder during height adjustment to pivot relative to the channel member 162, which is fixed to the main carriage frame. The pivot connection 156 of the piston rod 127 to the moveable wedge 23 also enables the movable wedge 23 to pivot relative to the piston rod 127 about pivot 156 during height adjustment while such wedge moves upward as it slides along the upper surface of the fixed wedge 25.

It should be noted that the horizontal gap adjustment cylinder 70 and the loading cylinder 80 of FIG. 1 for reciprocating the nose bar carriage between an extended position in which the nose bar contacts the log and a retracted position where the nose bar is spaced from the log sufficiently to enable loading of new logs into the lathe are omitted from FIG. 5 for greater clarity of the nose bar height adjustment mechanism. Thus, the nose bar carriage 22 is adjusted horizontally in the direction of arrows 186 to adjust the horizontal gap 69 between the nose bar and the knife by cylinders 70, 80 and is also adjusted in the vertical direction of arrows 188 to adjust the nose bar height 191 by cylinder 33 and movable wedge 23. Both of these horizontal and vertical adjustments are enabled by the resilient hold-down member 24. As stated previously, the U-shaped channel member 62 is fixed to the main carriage by the welding tab 150 so that it advances with the main carriage to move the nose bar roll 20 toward the center 32 of the log 28 during peeling, while maintaining the proper spacing relative to the knife. It should be noted that the knife 10 is mounted on the knife carriage 12 which is also mounted on the main carriage 14 for movement therewith so that the position of the main carriage sensed by the position cylinder 64 and transducer 69 indicates the radius and/or diameter of the log 28 during peeling by such knife.

Figures 8, 8A:
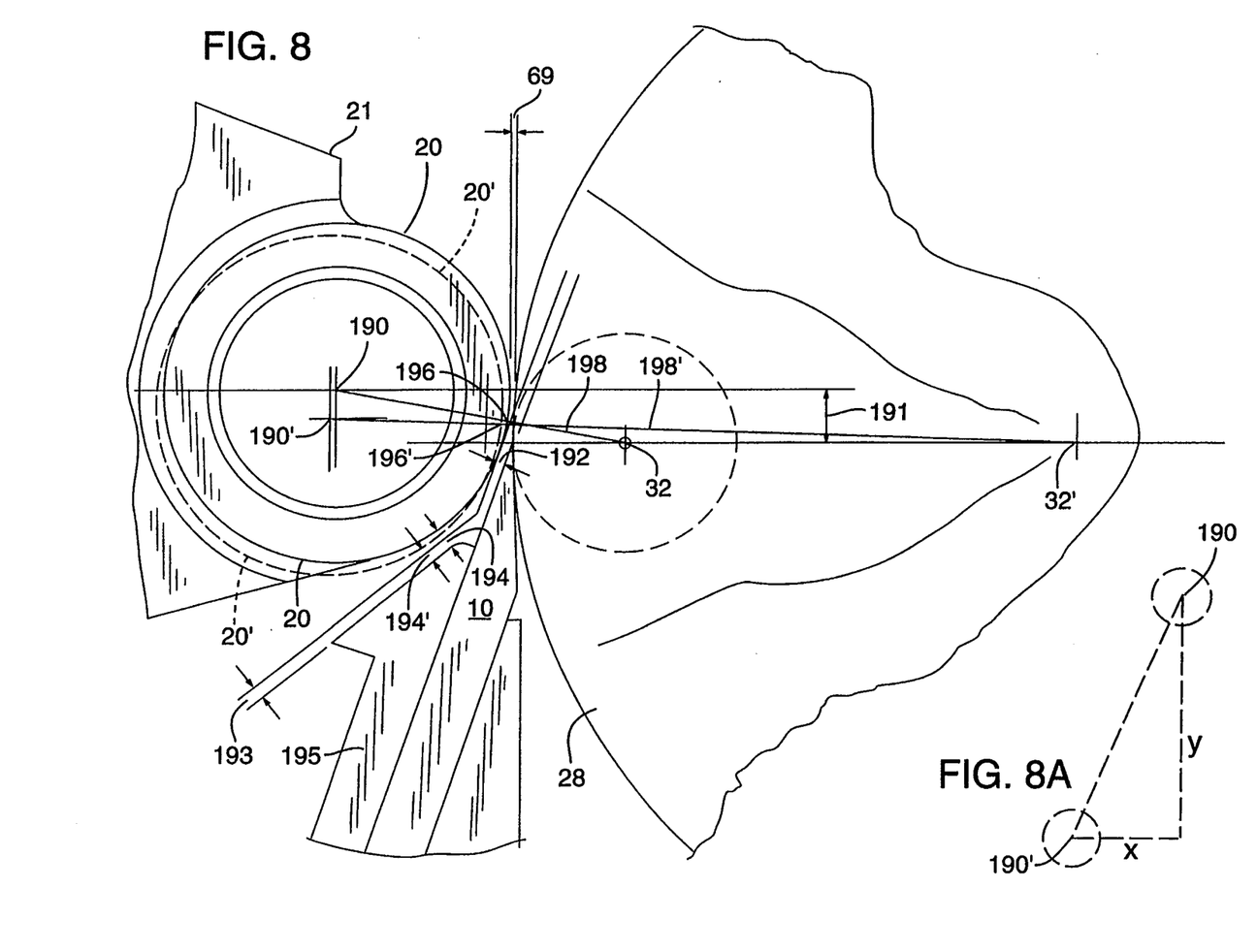
FIG. 8 is an enlarged view of a portion of FIG. 1 showing the automatic adjustment of the nose bar relative to the knife during peeling.
FIG. 8A is a diagram showing the adjustments of the nose bar of FIG. 8.

As shown in FIG. 8, the nose bar roll 20 is raised in height from an initial position 20' shown in phantom lines with its center of rotation at 190' to a final position 20 shown in solid lines with its center of rotation at 190 which is at a height 191 of 0.613" above the knife and a horizontal gap 69 of 0.041" when peeling logs 28 of large diameter of, for example, 12" in diameter to a smaller diameter of 2.5" diameter. The nose bar roll is adjusted in height 0.126" automatically by the control system of the present invention from initial position 190' of 0.487" above the lathe knife 10 into the raised position 190 of 0.613" height above such knife during peeling of a 12.0" diameter log to a 2.5" diameter log at a veneer peel thickness of 0.110". Thus in the example given in the previous lathe data table with a peel thickness of 0.110" the height adjustment of the nose bar roll 20 from the phantom line position 20' to the solid line position 20 is a total height adjustment in the vertical direction of 0.126" and a total horizontal gap adjustment of 0.054" as shown in FIG. 8A, and the total distance from point 190' to point 190, corresponding to the hypotenuse of the right triangle, is 0.137".

This peeling requires a veneer exit gap to knife, between the nose bar roll 20 and the knife blade 10 such gap being indicated by arrows 192, to be maintained at least the same as the veneer path width 193 such as 0.130" which is equal to the veneer thickness or peel of 0.110" plus a predetermined clearance spacing of 0.020". The veneer exit gap to the backing plate between the nose bar roll 20 and a knife blade backing plate 195, indicated by double-headed arrows 194, is also maintained at an amount equal to or slightly greater than the veneer path width of 0.130". These veneer exit gaps 192 and 194 are maintained at such widths when the nose bar roll 20 is raised from the phantom position 20' to the solid line position 20 as the log diameter decreases during peeling. Thus, the initial exit gap to backing plate 194' is increased slightly to the final exit gap 194, shown in solid lines, as the nose bar roll is raised. However, the important thing is that the log contact position 196 where the nose bar roll contacts the log immediately in front of the knife blade edge is maintained closely adjacent to such edge thereby increasing the quality of the veneer in both the lower position 20' of the nose bar roll and the upper position 20 of the nose bar roll. This log contact position 196 of the nose bar roll 20 is along a line 198 joining the center of rotation 32 of the log and the center of rotation 190 of the nose bar roll, at the point 196 where such line intersects the outer surface of such roll. It should be noted in FIG. 8 that the smallest log core diameter of 2.5" has its center of rotation 32 spaced horizontally about 1.25" from the knife 10 and the line 198 connects this center with the center of rotation 190 of the nose bar roll 20 in its raised position to provide log contact point 196. However, the largest log core diameter of 12.0" has its center of rotation 32' spaced horizontally about 6.0" from the knife 10 and the line 198' connects this center with the center of rotation 190' of the nose bar roll 20' in its lower position to provide log contact point 196'. Of course, the veneer exit gap and the nose bar height adjustment figures of the above example for a veneer peel thickness of 0.110" will all change to different values with a veneer peel thickness of 0.20" or other different veneer thicknesses.

It will be obvious to those having ordinary skill in the art that many changes may be made in the above described preferred embodiments of the invention. Therefore, the scope of the invention should be determined by the following claims.

I claim:

1. A method of operating a veneer lathe apparatus including the steps of:

rotating a log with a powered drive about an axis of rotation;

peeling veneer from the log with a lathe knife as the log is rotated;

compressing the surface of the log during peeling with a nose bar at a position immediately in front of the lathe knife and spaced from said knife by a horizontal knife gap;

sensing the diameter of the log during peeling to produce an electrical control signal corresponding to the log diameter; and automatically adjusting the vertical position of the nose bar relative to said knife during peeling in response to said control signal.

2. A method in accordance with claim 1 in which the horizontal knife gap between the nose bar and the lathe knife is automatically adjusted during peeling in response to said control signal.

3. A method in accordance with claim 1 in which the pitch angle of the lathe knife is automatically adjusted in response to said control signal.

4. A method in accordance with claim 1 in which the vertical position of the nose bar is adjusted by moving a wedge member in response to said control signal.

5. A method in accordance with claim 1 in which the temperature of the outer surface of the log is sensed by a temperature sensor to produce a temperature indication signal which is employed in the production of said control signal.

6. A method in accordance with claim 1 in which the vertical position of the nose bar is maintained during adjustment at a distance spaced from the knife to provide veneer exit gaps between the nose bar and the knife and between the nose bar and a knife backing member of a width substantially the same as a veneer path width equal to the veneer thickness plus a clearance space of a predetermined amount.

7. A method in accordance with claim 1 in which the control signal is supplied to a digital computer which controls the automatic adjustment.

8. A method in accordance with claim 6 in which the computer has stored in its digital data memory at least one data table of nose bar vertical positions relative to the lathe knife for different log diameters, different veneer thicknesses, and different knife pitch angles.

9. Veneer lathe apparatus comprising:

lathe drive mechanism for rotating a log about an axis of rotation;

a veneer knife for peeling veneer from the log as the log is being rotated;

a nose bar for compressing the surface of the log during peeling at a position in front of the lathe knife and spaced from said knife by a horizontal knife gap;

knife carriage for moving the knife toward the log during peeling;

a sensor for sensing the position of the knife carriage during peeling to determine the diameter of the log and to produce an electrical control signal corresponding to said log diameter; and an automatic control system for adjusting the vertical position of the nose bar relative to said knife during peeling in response to said control signal.

10. Apparatus in accordance with claim 9 in which automatic control system includes a wedge member which is moved in response to said control signal to adjust the vertical position of the nose bar.

11. Apparatus in accordance with claim 10 in which the movable wedge member is moved by a control cylinder relative to a fixed wedge member attached to a frame to provide the adjustment of the vertical position of the nose bar.

12. Apparatus in accordance with claim 11 in which the fixed wedge member has a mechanical adjustment device to adjust its position relative to the frame prior to peeling.

13. Apparatus in accordance with claim 11 which also includes guide members that guide the sliding movement of both wedge members, and oil passages in said wedge members to lubricate the bearing surfaces of the wedge members.

14. Apparatus in accordance with claim 9 in which the vertical position is maintained during adjustment at a distance spaced from the knife to provide veneer exit gaps between the nose bar and the knife and between the nose bar and a knife backing member of a width substantially the same as a veneer path width equal to the veneer thickness plus a clearance space of a predetermined amount.

15. Apparatus in accordance with claim 9 in which the automatic control system includes a digital computer to which the control signal is supplied.

16. Apparatus in accordance with claim 15 in which the computer has stored in its digital data memory at least one data table of nose bar positions relative to the lathe knife for different log diameters, different veneer thicknesses, and different knife pitch angles.

17. Apparatus in accordance with claim 9 in which the automatic control system also adjusts the pitch angle of the lathe knife in response to the control signal.

18. Apparatus in accordance with claim 9 which also includes a temperature sensor for sensing the temperature of the outer surface of the log to produce a temperature indication signal which is also employed to produce the control signal.

19. Apparatus in accordance with claim 9 in which the nose bar is a nose bar roller.

20. Apparatus in accordance with claim 10 in which the nose bar is attached to a nose bar support and which includes a resilient hold down device that resiliently urges the nose bar support into contact with the moveable wedge member.

* * * * *